(12) United States Patent
Theobald et al.

(10) Patent No.: US 8,459,003 B2
(45) Date of Patent: Jun. 11, 2013

(54) EXHAUST GAS AFTER-TREATMENT HAVING REDUCED RHODIUM DEPLETION

(75) Inventors: Jörg Theobald, Lehre (DE); Alf Degen, Meinersen (DE); Ekkehard Pott, Gifhorn (DE)

(73) Assignee: Volkswagen AG, Wolfsburg (DE)

( * ) Notice: Subject to any disclaimer, the term of this patent is extended or adjusted under 35 U.S.C. 154(b) by 809 days.

(21) Appl. No.: 12/596,716

(22) PCT Filed: Apr. 1, 2008

(86) PCT No.: PCT/EP2008/002588
§ 371 (c)(1),
(2), (4) Date: Jan. 19, 2010

(87) PCT Pub. No.: WO2008/128624
PCT Pub. Date: Oct. 30, 2008

(65) Prior Publication Data
US 2011/0167796 A1    Jul. 14, 2011

(30) Foreign Application Priority Data
Apr. 20, 2007    (DE) .......................... 10 2007 019 197

(51) Int. Cl.
*F01N 3/00*    (2006.01)
(52) U.S. Cl.
USPC ................... 60/274; 60/285; 60/297; 60/299; 60/301; 422/168; 422/171; 422/177
(58) Field of Classification Search
USPC .... 60/274, 280, 285, 297, 299, 301; 422/168, 422/171, 177, 180
See application file for complete search history.

(56) References Cited

U.S. PATENT DOCUMENTS

| | | | |
|---|---|---|---|
| 6,058,699 A * | 5/2000 | Castagna et al. | 60/284 |
| 6,276,132 B1 * | 8/2001 | Kanesaka et al. | 60/286 |
| 7,517,510 B2 * | 4/2009 | Chen et al. | 423/213.2 |
| 7,875,250 B2 * | 1/2011 | Nunan | 422/177 |
| 7,931,874 B2 * | 4/2011 | Han et al. | 422/177 |
| 8,211,824 B2 * | 7/2012 | Akamine et al. | 502/332 |
| 8,220,251 B2 * | 7/2012 | Oger et al. | 60/286 |
| 2002/0131914 A1 | 9/2002 | Sung | 422/177 |
| 2003/0079520 A1 | 5/2003 | Ingalls, Jr. et al. | |

FOREIGN PATENT DOCUMENTS

| | | |
|---|---|---|
| EP | 1 121 979 A1 | 8/2001 |
| WO | 00/62923 | 10/2000 |

OTHER PUBLICATIONS

International PCT Search Report, PCT/EP2008/002588, 4 pages.

* cited by examiner

*Primary Examiner* — Binh Q Tran
(74) *Attorney, Agent, or Firm* — King & Spalding L.L.P.

(57) ABSTRACT

In a method for the after-treating of an exhaust gas from a preferably direct-injection and/or spark-ignition internal combustion engine, the exhaust gas is fed through a catalytic converter system connected downstream of the internal combustion engine. The system has at least one catalyst with a noble metal depletion having at least the elements palladium and rhodium which are present in a weight ratio of >5:1, 6:1, 7:1, 8:1, 9:1, 10:1, 11:1, or 12:1. In the new European driving cycle, the catalyst exceeds a temperature $T_K$ of 300° C., 450° C., 550° C., 600° C. within a time interval of 30 s, preferably 20 s, especially preferably 10 s after starting the engine, and/or the cumulative untreated emissions of hydrocarbons not exceeding 0.05 g/km and/or of nitrogen oxides not exceeding 0.04 g/km within a time interval of 10 s, preferably 20 s, especially preferably 30 s after starting the engine, and/or the engine achieving at least the emissions limit values of EU standard 4, preferably EU standard 5.

34 Claims, 4 Drawing Sheets

EXHAUST GAS AFTER-TREATMENT HAVING REDUCED RHODIUM DEPLETION

CROSS-REFERENCE TO RELATED APPLICATIONS

This application is a U.S. National Stage Application of International Application No. PCT/EP2008/002588 filed Apr. 1, 2008, which designates the United States of America, and claims priority to German Application No. 10 2007 019 197.0 filed Apr. 20, 2007, the contents of which are hereby incorporated by reference in their entirety.

TECHNICAL FIELD

The present invention relates to a method and to devices in the field of exhaust gas after-treatment in internal combustion engines according to the preambles of the independent claims.

BACKGROUND

Already known in the art are catalytic converter systems for internal combustion engines for motor vehicles, by which pollutants in the exhaust gases of internal combustion engines can be converted into harmless or less harmful components. Such catalytic converter systems typically comprise a catalytic converter often arranged close to the engine and comprising a catalytically effective noble metal depletion of the platinum group, particularly consisting of the elements platinum, palladium and rhodium. Since platinum has a low temperature stability, noble metal depletions comprising the elements palladium and rhodium are preferred, wherein rhodium is applied due to its reducing effect on the nitrogen oxide (NOx) conversion and palladium is applied due to its oxidizing effect on the carbon hydride (HC) and carbon monoxide (CO) conversions.

The noble metal depletion of the catalytic converters exhibits a considerable cost factor, however, may not be reduced arbitrarily, if the legal exhaust gas standards for internal combustion engines and motor vehicles, respectively, shall be fulfilled. Particularly, a weight ratio of 5:1 of the elements palladium and rhodium and a specific depletion comprising rhodium of 6.66 g/ft$^3$ in relation to the catalytic converter volume VK is currently required in the noble metal depletion in order to obtain the European Exhaust Gas Standard EU 4. The values mentioned for the specific depletion comprising rhodium correspond to a absolute depletion comprising rhodium of 0.0296 g for a catalytic converter having a volume of 1.258 liters and to a absolute depletion of 0.0236 g for a catalytic converter having a volume of 1 liter, wherein in each case a cell density of 600 cpsi (cells per square inch) and a wall thickness of the passages passed by the exhaust gas of 4.3 mil (1 mil=0.0254 mm) was assumed. Since the price per gram of rhodium is higher by about a factor 10 than the price per gram of palladium, it is clear, that a reduction of the relative and absolute rhodium depletion of a catalytic exhaust gas converter is desirable because of cost reasons as well as for a sustainable resource management.

A main factor so far opposing a reduction of the rhodium depletion was, that the exhaust gas converter specific startup or light off temperature following a cold start when using a reduced rhodium depletion of the catalytic converter could not be reached fast enough in order to fulfill the legal exhaust gas emission limit values at least when operating according to the New European Driving Cycle.

SUMMARY

According to various embodiments, an exhaust gas of an internal combustion engine can be purified at reduced cost and comprising a reduced consumption of rhodium while meeting standards for lower emissions.

According to an embodiment, in a method for after-treatment of an exhaust gas of a preferably direct-injection and/or spark-ignition internal combustion engine, the exhaust gas is fed through a catalytic converter system connected downstream of the internal combustion engine and comprising at least one catalytic converter having a noble metal depletion comprising at least the elements palladium and rhodium, wherein the elements palladium and rhodium are present in the noble metal depletion in a weight ratio of >5:1, 6:1, 7:1, 8:1, 9:1, 10:1, 11:1 or 12:1, and after an engine start of the internal combustion engine during an operation according to the New European Driving Cycle the catalytic converter exceeds a temperature $T_K$ of 300° C., 450° C., 550° C., 600° C. within a time interval of 30 seconds, preferably 20 seconds, particularly preferred 10 seconds, and/or after an engine start during an operation according to the New European Driving Cycle the cumulative exhaust gas emissions before the catalytic converter consisting of carbon hydrides do not exceed 0.05 g/km and/or consisting of nitrogen oxides do not exceed 0.04 g/km within a time interval of 10 seconds, preferably 20 seconds, particularly preferred 30 seconds, and/or the internal combustion engine achieves at least the emission limit values of EU Standard 4, preferably of EU Standard 5 during the New European Driving Cycle.

According to another embodiment, in a method for designing a preferably direct-injection and/or spark-ignition internal combustion engine comprising a catalytic converter system arranged downstream of the internal combustion engine and comprising a catalytic converter having a noble metal depletion comprising the elements palladium and rhodium, wherein the elements palladium and rhodium are present in the noble metal depletion in a weight ratio of >5:1, 6:1, 7:1, 8:1, 9:1, 10:1, 11:1 or 12:1, after an engine start of the internal combustion engine during an operation according to the New European Driving Cycle the catalytic converter exceeds a temperature $T_K$ of 300° C., 450° C., 550° C., 600° C. within a time interval of 30 seconds, preferably 20 seconds, particularly preferred 10 seconds, and/or after an engine start during an operation according to the New European Driving Cycle the cumulative exhaust gas emissions before the catalytic converter consisting of carbon hydrides do not exceed 0.05 g/km and/or consisting of nitrogen oxides do not exceed 0.04 g/km within a time interval of 10 seconds, preferably 20 seconds, particularly preferred 30 seconds, and/or the internal combustion engine achieves at least the emission limit values of EU Standard 4, preferably of EU Standard 5 during the New European Driving Cycle.

According to a further embodiment, a temperature $T_K$ of 300° C. is not undercut or only is undercut for time intervals of altogether x seconds within the remaining measurement interval of the New European Driving Cycle after a starting phase of 30 seconds, preferably 20 seconds, particularly preferred 10 seconds. According to a further embodiment, the catalytic converter may have a depletion comprising rhodium $B_{Rh}$ between 0.221 g and 0.106 g, preferably in a catalytic converter comprising a volume $V_K$ of 1.0 l a $B_{Rh}$ of 0.177 g, 0.142 g or 0.106 g or preferably in a catalytic converter comprising a $V_K$=1.258 l a $B_{Rh}$ of 0.221 g, 0.178 g or 0.134 g. According to a further embodiment, the catalytic converter may have a specific noble metal depletion comprising palladium and rhodium of at most 100 g/ft$^3$, 80 g/ft$^3$, 60 g/ft$^3$ 40 g/ft³ or 20 g/ft³ in relation to the volume $V_K$ of the catalytic converter. According to a further embodiment, the catalytic converter may have a volume $V_K$ of between 0.9 l and 1.4 l. According to a further embodiment, the catalytic converter may have a comb shaped support comprising a surface formed as a washcoat having a geometric surface GSA of between 3.0 m² and 4.0 m². According to a further embodiment, the internal combustion engine can be charged by means of an exhaust-driven turbocharger comprising a compressor section and a turbine. According to a further embodiment, the internal combustion engine in addition may be supercharged by means of a compressor arranged in an air inlet port upstream of the compressor section of the exhaust-driven turbocharger. According to a further embodiment, the internal combustion engine can be operated or is operable without an external exhaust gas recirculation. According to a further embodiment, the internal combustion engine may have an engine displacement of between 0.9 l and 2 l, preferably of 1.2 l or 1.4 l. According to a further embodiment, the internal combustion engine may provide a specific output power of 50 to 80 KW/l and/or a specific torque of 120 to 170 Nm/l. According to a further embodiment, after the engine start a heating action can be initiated, which comprises a spark retard comprising ignition angles of at least 10° after a top dead center ignition point, a late injection and/or a multiple injections. According to a further embodiment, the heating action may comprise an exhaust gas afterburning and/or a fuel post-injection. According to a further embodiment, the internal combustion engine may have an operating point related specific fuel consumption of less than 580 g/kWh and less than 550 to 510 g/kWh, respectively, at a rotational speed of 1200 min⁻¹ and a effective medium pressure of 1 bar and/or 410 g/KWh, preferably 390 to 375 g/KWh at 2000 min⁻¹ and at 2 bars of effective medium pressure and/or 300 g/KWh, preferably 290 to 280 g/KWh at 3500 min⁻¹ and 6 bars of effective medium pressure. According to yet another embodiment, a device for after-treatment of an exhaust gas of a preferably direct-injection and/or spark-ignition internal combustion engine for a motor vehicle, may comprise a catalytic converter system connected downstream of the internal combustion engine and comprising at least one catalytic converter having a noble metal depletion comprising at least the elements palladium and rhodium, wherein the elements palladium and rhodium are present in the noble metal depletion in a weight ratio of >5:1, 6:1, 7:1, 8:1, 9:1, 10:1, 11:1, 12:1 or 18:1, and after an engine start of the internal combustion engine during an operation according to the New European Driving Cycle the catalytic converter has a temperature $T_K$ of at least 300° C., 450° C., 550° C., 600° C. within a time interval of 30 seconds, preferably 20 seconds, particularly preferred 10 seconds, and/or after an engine start of the internal combustion engine during an operation according to the New European Driving Cycle the cumulative exhaust gas emissions before the catalytic converter consisting of carbon hydrides do not exceed 0.05 g/km and/or consisting of nitrogen oxides do not exceed 0.04 g/km within a time interval of 10 seconds, preferably 20 seconds, particularly preferred 30 seconds, and/or the internal combustion engine achieves at least the emission limit values of EU Standard 4, preferably of EU Standard 5 during the New European Driving Cycle.

According to yet another embodiment, a motor vehicle may comprise a preferably direct-injection and/or spark-ignition internal combustion engine and comprising a device for after-treatment of an exhaust gas of the internal combustion engine comprising a catalytic converter system connected downstream of the internal combustion engine and comprising a catalytic converter having a noble metal depletion comprising the elements palladium and rhodium, wherein the elements palladium and rhodium are present in the noble metal depletion in a weight ratio of >5:1, 6:1, 7:1, 8:1, 9:1, 10:1, 11:1, 12:1 or 18:1 and after an engine start of the internal combustion engine during an operation according to the New European Driving Cycle the catalytic converter has a temperature TK of at least 300° C., 450° C., 550° C., 600° C. within a time interval of 30 seconds, preferably 20 seconds, particularly preferred 10 seconds, and/or after an engine start of the internal combustion engine during an operation according to the New European Driving Cycle the cumulative exhaust gas emissions before the catalytic converter consisting of carbon hydrides do not exceed 0.05 g/km and/or consisting of nitrogen oxides do not exceed 0.04 g/km within a time interval of 10 seconds, preferably 20 seconds, particularly preferred 30 seconds, and/or the internal combustion engine achieves at least the emission limit values of EU Standard 4, preferably of EU Standard 5 during the New European Driving Cycle.

BRIEF DESCRIPTION OF THE DRAWINGS

Further aspects and advantages of the invention are to be taken from the following description including the accompanying drawings also independently of the summary of the characteristics in the patent claims.

DETAILED DESCRIPTION

Figure 1:
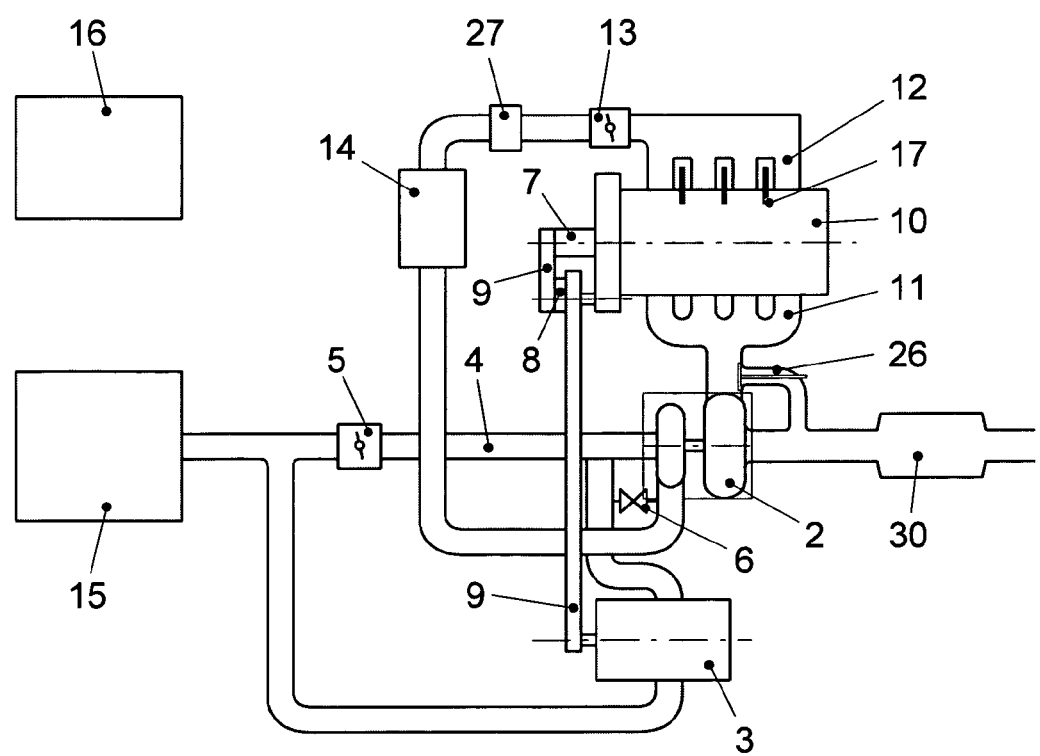
FIG. 1 shows an embodiment of an internal combustion engine.

In a method for after-treatment of an exhaust gas of an internal combustion engine according to an embodiment, wherein the exhaust gas is fed through a catalytic converter system connected downstream of the internal combustion engine and comprising at least one catalytic converter and the catalytic converter has a noble metal depletion comprising the elements palladium and rhodium, the elements palladium and rhodium are comprised in the noble metal depletion having a weight ratio of >5:1, 6:1, 7:1, 8:1, 9:1, 10:1, 11:1, 12:1 or 18:1, and the catalytic converter, after an engine start of the internal combustion engine during an operation according to the New European Driving Cycle exceeds a temperature TK of 300° C., 400° C., 550° C., 600° C. within a time interval of 30 seconds. According to an embodiment, the selection of the weight ratio of palladium to rhodium in combination with the rise of the temperature of the catalytic converter to the temperatures stated within a time interval of 30 seconds facilitates to achieve low tail pipe cold start emissions at low cost and with reduced application of rhodium. Defined here as the temperature TK of the catalytic converter is the temperature of a catalytic coating of the catalytic converter approximately 10 mm downstream of an exhaust gas inlet area of the catalytic converter, wherein at least 50 percent of the cross-sectional area of the catalytic converter in this range shows the temperature mentioned.

It is particularly preferred, if the temperatures TK are already exceeded after 20 seconds or 10 seconds after starting the engine.

According to an embodiment it is further provided for additionally or alternatively, that after an engine start of the internal combustion engine comprising a catalytic converter the cumulative exhaust gas emissions before the catalytic converter consisting of carbon hydrides do not exceed 0.05 g/km, preferably 0.03 g/km and/or consisting of nitrogen oxides do not exceed 0.04 g/km, preferably 0.02 g/km within a time interval of 30 seconds, preferably 20 seconds, particularly preferred 10 seconds during an operation according to the New European Driving Cycle. According to an embodiment, the values of the exhaust gas emission before the catalytic converter within the time intervals mentioned and in combination with the depletion of the catalytic converter having noble metal according to an embodiment facilitate to achieve low tail pipe emissions after a cold start in a cost-saving manner.

According to an embodiment it is provided for additionally or alternatively, that the internal combustion engine comprising a catalytic converter system at least achieves the emissions limit values of EU Standard 4, preferably even of EU Standard 5 during the New European Driving Cycle. The selection of the weight ratio of palladium to rhodium in combination with the relatively low exhaust gas emission of nitrogen oxides and carbon hydrides before the catalytic converter according to an embodiment facilitates to achieve the legally compulsory tail pipe emission at low costs and comprising a reduced application of rhodium.

According to yet another embodiment, a device for after-treatment of an exhaust gas of an internal combustion engine for a motor vehicle may comprise a catalytic converter system connected downstream of the internal combustion engine and comprising at least one catalytic converter having a noble metal depletion comprising at least the elements palladium and rhodium, wherein it is provided for, that the elements palladium and rhodium are present in the noble metal depletion in a weight ratio of >5:1, 6:1, 7:1, 8:1, 9:1, 10:1, 11:1, 12:1 or 18:1 and wherein after an engine start of the internal combustion engine during an operation according to the New European Driving Cycle the catalytic converter has a temperature TK of at least 300° C., 450° C., 550° C., 600° C. within a time interval of 30 seconds, preferably 20 seconds, particularly preferred 10 seconds and/or after an engine start of the internal combustion engine during an operation according to the New European Driving Cycle within a time interval of 30 seconds, preferably 20 seconds, particularly preferred 10 seconds the cumulative exhaust gas emission before the catalytic converter of carbon hydrides does not exceed 0.05 g/km, preferably 0.03 g/km and/or of nitrogen oxides does not exceed 0.04 g/km, preferably 0.02 g/km and/or the internal combustion engine achieves at least the emission limit values according to EU Standard 4, preferably according to EU Standard 5 during a New European Driving Cycle.

According to yet another embodiment, a motor vehicle may comprise an internal combustion engine and a device for after-treatment of an exhaust gas of the internal combustion engine comprising a catalytic converter system connected downstream of the internal combustion engine and comprising at least one catalytic converter having a noble metal depletion comprising at least the elements palladium and rhodium, wherein it is provided for, that the elements palladium and rhodium are comprised in the noble metal depletion in a weight ratio of >5:1, 6:1, 7:1, 8:1, 9:1, 10:1, 11:1, 12:1 or 18:1 and that after an engine start of the internal combustion engine during an operation according to the New European Driving Cycle the catalytic converter has a temperature TK of at least 300° C., 450° C., 550° C., 600° C. within a time interval of 30 seconds, preferably 20 seconds, particularly preferred 10 seconds and/or that after an engine start of the internal combustion engine during an operation according to the New European Driving Cycle the cumulative exhaust gas emissions before the catalytic converter consisting of carbon hydrides do not exceed 0.05 g/km, preferably 0.03 g/km and/or consisting of nitrogen oxides do not exceed 0.04 g/km, preferably 0.02 g/km within a time interval of 10 seconds, preferably 20 seconds, particularly preferred 30 seconds and/or the internal combustion engine achieves at least the emission limit values according to EU Standard 4, preferably according to EU Standard 5 during a New European Driving Cycle.

According to an embodiment it is further provided for, that as the lower limit for the specific depletion of the catalytic converter having rhodium a predetermined value is chosen, at which a predetermined level of homogeneity of the distribution of rhodium is not undercut, since otherwise the mechanical or thermal stability of the catalytic converter coating is not ensured. Preferred is a depletion comprising rhodium of greater/equal 1 g/ft$^3$, which in practice serves to reach a sufficient homogeneity.

According to an embodiment, preferably a spark-ignition and/or a direct-injection internal combustion engine is provided, by which the heating according to an embodiment of the catalytic converter after an engine start and/or the emission limit values according to an embodiment may be accomplished.

If after a starting phase of 30 seconds a temperature TK of 300° C. is not undercut or only undercut during partial intervals of a maximum of 2 seconds, preferably 1 second within the remaining measurement interval of the New European Driving Cycle, it is ensured, that the catalytic converter also has a sufficiently high operating temperature during the transient driving operation in order to avoid emission peaks, which may accelerate the deterioration of the catalytic converter.

In further embodiments of the method it is provided for, that the starting phase amounts to 20 seconds or 10 seconds.

It is advantageous, when the catalytic converter has a depletion of rhodium $B_{Rh}$ between 0.221 g and 0.106 g, preferably in a catalytic converter comprising a volume $V_K$ of 1.0 l a $B_{Rh}$ of 0.177 g, 0.142 g or 0.106 g or preferably in a catalytic converter comprising a $V_K$ =1.258 l a $B_{Rh}$ of 0.221 g, 0.178 g or 0.134 g.

It is further advantageous, when the catalytic converter has a specific noble metal depletion of palladium and rhodium of a maximum of 100 g/ft$^3$, 80 g/ft$^3$, 60 g/ft$^3$, 40 g/ft$^3$ or 20 g/ft$^3$ in relation to the catalytic converter volume $V_K$, in order to securely achieve EU Standard 4 or even EU Standard 5.

The catalytic converter preferably has a volume $V_K$ of between 0.9 l and 1.4 l. Advantageously, the catalytic converter has a comb shaped support comprising a surface formed as a washcoat and has a geometric surface GSA between 3.0 m$^2$ and 4.0 m$^2$. Here, the geometric surface GSA is referred to as the surface of the comb shaped support without the washcoat.

Primarily in smaller and torque oriented internal combustion engines exhaust-driven turbocharger represent important concepts, by which the output power density is increased while maintaining engine displacement, an increase in engine torque is accomplished and further a downsizing of larger engines may be realized. Provided for in a further embodiment is therefore a supercharging of the internal combustion engine by means of an exhaust-driven turbocharger which comprises a compressor section and a turbine, wherein the exhaust-driven turbocharger is arranged upstream of the catalytic converter system. Although such an exhaust-driven turbocharger leads to a reduction of the exhaust gas temperature, typically between 50° C. and 150° C., the internal combustion engine according to an embodiment affords a quick heating of the catalytic converter system up to operating temperature.

In order to improve the output power characteristics of the internal combustion engine it is further provided for, that it is additionally charged using a compressor arranged in an air inlet port upstream of the compressor section of the exhaust-driven turbocharger.

For a reduction of the cumulative exhaust gas NOx emission before the catalytic converter and while at the same time increasing the degree of efficiency by a de-throttling of the internal combustion engine it is particularly common during part throttle operation to operate internal combustion engines using an external exhaust gas recirculation in order to not exceed the legal exhaust gas limits for NOx. According to a further embodiment, it is in contrast provided for, that the internal combustion engine is operated or is operable without an external exhaust gas recirculation, since the exhaust gas NOx emission before the catalytic converter achievable by the engine is low and the exhaust gas limits can also be accomplished without the external exhaust gas recirculation—whereby a constructional simplification and respective cost advantages can be achieved.

Preferably, the method is used in an internal combustion engine comprising an engine displacement between 0.9 l and 2 l, preferably 1.2 l or 1.4 l. The internal combustion engine may provide a specific output power ranging from 50 kW/l to 80 kW/l and/or a specific torque ranging from 120 to 170 Nm/l.

In order to assure a quick warm-up after starting the engine a heating action is initiated with respect to the catalytic converter, which comprises a spark retard comprising an ignition angle of at least 10° KW (crankshaft angle) after a top dead center (ZOT) ignition point and/or a multiple injection.

Furthermore, a late fuel injection may be used as the heating action for the catalytic converter, preferably having an end of the injection comprising an injection angle of 8° KW to 10° KW (crankshaft angle) before ZOT.

In a further embodiment the heating action comprises an exhaust gas afterburning and/or a fuel post-injection.

Advantageous output power data may be achieved simultaneously comprising low pollutant emissions, when the internal combustion engine has an operating point related specific fuel consumption of less than 580 g/KWh, respectively less than 550 to 510 g/KWh at an engine speed of 1200 $min^{-1}$ and an effective medium pressure of 1 bar and/or 410 g/kWh, preferably 390 to 375 g/KWh at 2000 $min^{-1}$ and 2 bars of effective medium pressure and/or 300 g/kWh, preferably 290 to 280 g/kWh at 3500 $min^{-1}$ and 6 bars of effective medium pressure.

The direct-injection internal combustion engine for a middle class vehicle schematically depicted in FIG. 1 is designed as an Otto engine comprising an output power of 100 kW to 170 kW and has a volume of 1.4 liters. It is to be understood, that the invention also incorporates internal combustion engines comprising different output power data as well as different exhaust gas turbocharging or no exhaust gas turbocharging.

The internal combustion engine 10 includes a direct-injection system comprising injectors 17 and an air intake path comprising an intake manifold 12. Arranged further in the air intake path of the internal combustion engine 10 is an air cleaner 15, a compressor 3, a bypass line 4 bridging the compressor 3 with a throttle plate 5, a compressor section of an exhaust-driven turbocharger 2, an intercooler 14, an EGR valve 27 of an otherwise not depicted external exhaust gas recirculation (EGR) and a electronic throttle plate 13. In a further embodiment the EGR system and the EGR valve 27 are omitted.

In a further embodiment the internal combustion engine is capable of stratified charging and for example has a so called tumble flap arranged in the air inlet port. Typically, during stratified charging the fuel is injected very late within the compression phase. This way it directly arrives into the air inside the combustion chamber, which air on the one hand was transferred into a roller shaped charging movement (tumble) by the position of the flap in the inlet port and by the specific form of the piston base on the other hand. It is to be understood, that the invention may also be applied to other stratified charging methods.

The compressor throttle plate 5 controls the compression of compressor 3 and supplies sufficient air to the compressor section of the exhaust-driven turbocharger 2 when the delivery rate of compressor 3 is inadequate or the compressor 3 is thrown off at sufficiently high numbers of revolutions. The diverter valve 6 serves to protect the exhaust-driven turbocharger 2 against excessive revolutions during coasting. Compressor 3 is driven by a crankshaft 7 of the internal combustion engine via a belt 9. In doing so, the drive of the compressor 3 is separable from the crankshaft 7 by means of a clutch 8, for example a magnetically actuated clutch. Within the lower rotational speed range up to 1700 revolutions per minute a doubled charging is effected by the compressor 3. At higher rotational speeds the compressor 3 is thrown off and the internal combustion engine is operated using an ordinary charging by means of the exhaust-driven turbocharger 2. This way a strong torque characteristic of the internal combustion engine is realized across a broad rotational speed range.

Arranged in the exhaust gas path of the internal combustion engine is an exhaust manifold 11, the turbine of the exhaust-driven turbocharger 2, a wastegate 26 as well as a catalytic converter 30 according to an embodiment. In a further embodiment one or more additional catalytic converters may be arranged in the exhaust gas path of the internal combustion engine 10.

For the control and regulation, respectively, of the internal combustion engine 10 there is provided an engine control unit 16 which is, as common, connected to a variety of sensors as well as to actuating means. A regulation of the air-fuel ratio supplied to the internal combustion engine 10 is carried out via a measurement of an oxygen concentration of the exhaust gas by means of a lambda oxygen sensor (not shown). Further, arranged in the region of the catalytic converter 30 may be a temperature sensor (also not shown), through which a measurement of an exhaust gas temperature may be carried out in order to determine a temperature $T_K$ of the catalytic converter. Defined as the temperature $T_K$ of the catalytic converter is the temperature of a catalytic coating of the catalytic converter about 10 mm downstream of an exhaust gas inlet area of the catalytic converter, wherein at least 50% of the cross-sectional area of the catalytic converter exhibits the respective temperature in this region.

The engine control unit controls and regulates, respectively, the internal combustion engine 10 dependent on signals derived from the sensors mentioned as well as dependent on different operating parameters of the internal combustion engine 10.

The catalytic converter 30 comprises a support coated with washcoat and according to an embodiment is provided with a noble metal depletion comprising at least the elements palladium and rhodium, wherein the elements palladium and rhodium are present in the noble metal depletion in a weight ratio of >5:1, 6:1, 7:1, 8:1, 9:1, 10:1, 11:1, 12:1 or 18:1. The washcoat is formed by a porous metal oxide layer which is applied to the support and, for example, includes aluminum oxide, or silicon oxide, cerium dioxide, titanium dioxide or zirconium oxide. As a support extruded ceramic comb shaped monolithes comprising comb shaped cells are utilized. The cell density preferably is in a range between 500 and 800 cpsi, particularly 600 cpsi. The cell walls preferably have a thickness of 2.5 mil to 4.5 mil, particularly of 4.3 mil.

The specific noble metal depletion of the catalytic converter comprising palladium and rhodium in relation to the catalytic converter volume $V_K$ is at most 100 g/ft$^3$, 80 g/ft$^3$, 60 g/ft$^3$ or 20 g/ft$^3$.

Preferably, the geometric surface GSA is between 3.0 m$^2$ and 4.0 m$^2$, wherein the geometric surface GSA is referred to as the surface of the comb shaped support without the washcoat.

It is considered advantageous, when the catalytic converter has a depletion comprising rhodium $B_{Rh}$ between 0.221 g and 0.106 g, preferably in a catalytic converter comprising a volume $V_K$ of 1.0 l, a $B_{Rh}$ of 0.177 g, 0.142 g or 0.106 g or preferably in a catalytic converter comprising a $V_K$=1.258 l, a $B_{Rh}$ of 0.221 g, 0.178 g or 0.134 g.

The specific depletion of the catalytic converter according to an embodiment is chosen in a way that a sufficiently homogeneous distribution of the rhodium is ensured. A preferred value for the rhodium depletion is >=1 g/ft$^3$.

Preferably, the catalytic converter has a volume $V_K$ between 0.9 l and 1.4 l.

According to an embodiment, the internal combustion engine 10 is designed such, that the catalytic converter exceeds a temperature $T_K$ of 300° C. within a time interval of 30 sec after an engine start at an operation according to the New European Driving Cycle.

Figure 2:
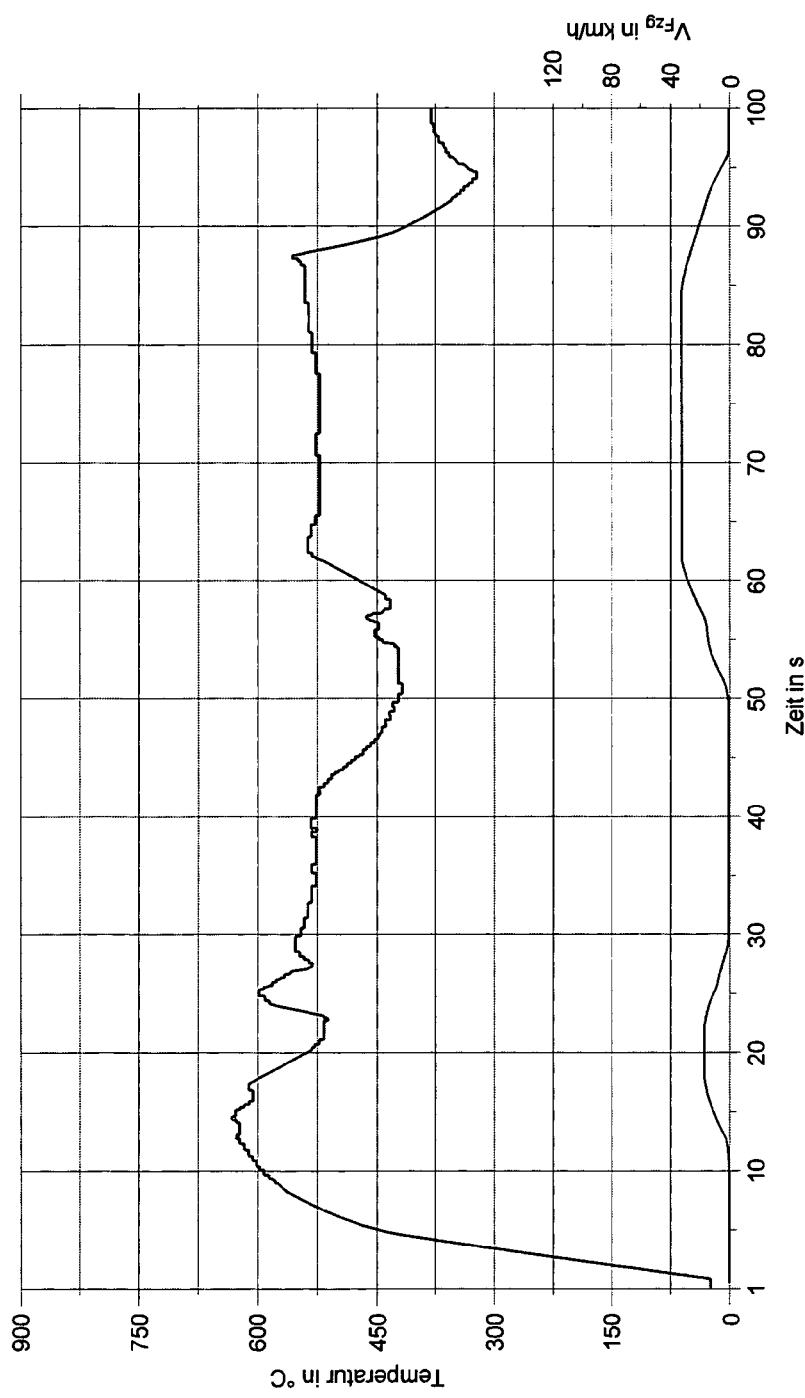
FIG. 2 shows the time dependent behavior of the temperature $T_K$ of the catalytic converter during a time interval from 0 to 100 sec.

Illustrated in FIG. 2 is a temporal behavior of the temperature during a time interval between 0 and 100 sec. for a method according to an embodiment. The temperature $T_K$ shows a sharp rise during the first 10 seconds up to a value around 600° C. and does not undercut the temperature of 300° C. during further progress.

Figure 3:
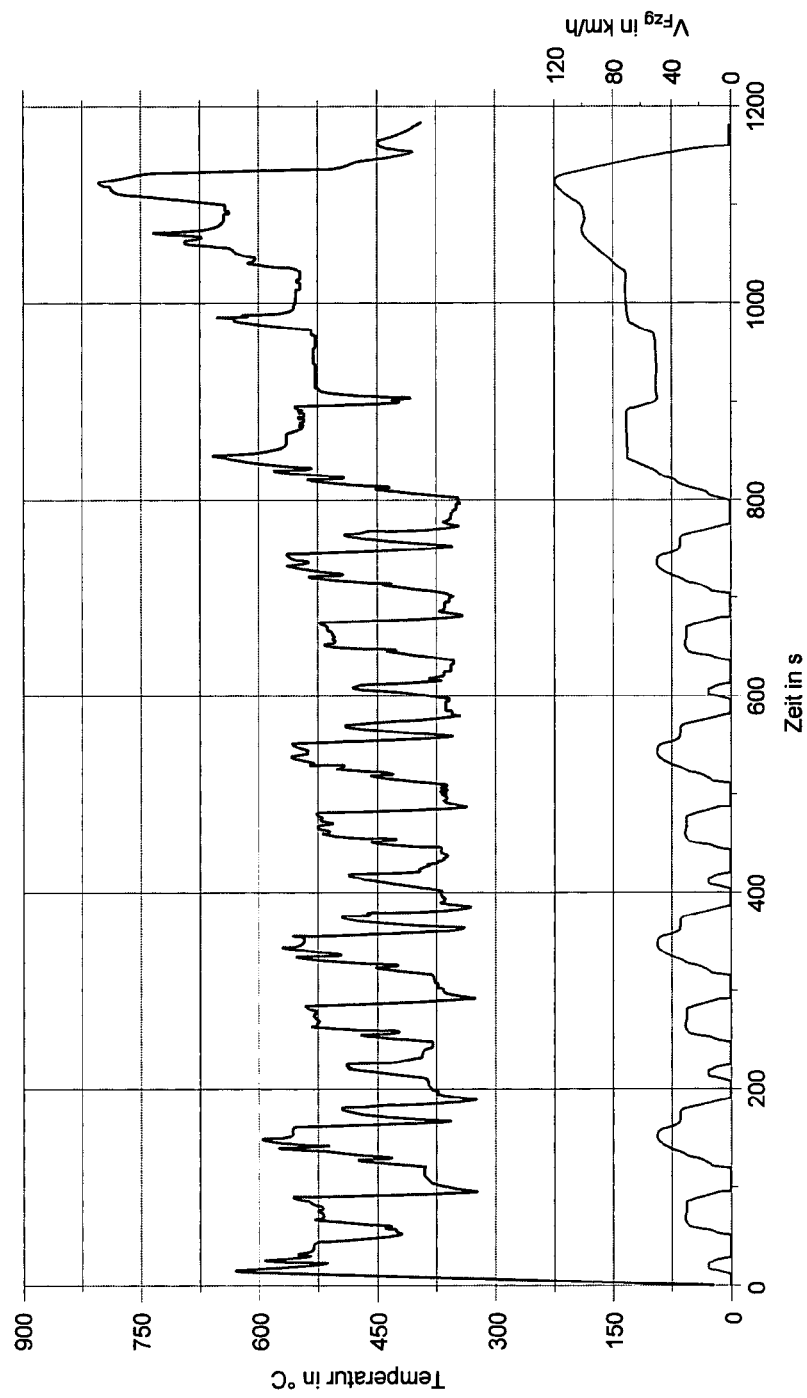
FIG. 3 shows the time dependent behavior of the temperature $T_K$ of the catalytic converter during a time interval from 0 to 1200 sec.

Depicted in FIG. 3 is the temporal behavior of the temperature $T_K$ of the catalytic converter during a time interval from 0 to 1200 sec. for an engine having 1.41 l of engine displacement and 88 kW of output power and comprising an exhaust-driven turbocharger without an additional compressor and a catalytic converter system connected downstream of the exhaust-driven turbocharger, wherein it can be seen, that the temperature $T_K$ does not undercut 300° C. until the end of the time interval. Throughout the measurements according to FIGS. 2 and 3 a driving profile according to the New European Driving Cycle was used as can be seen from the temporal behavior of $v_{FZg}$. In each case the starting basis was an engine start at standard conditions of +20° C. ambient and vehicle temperatures at a relative humidity in a range between 30% and 70%.

According to an embodiment it is provided for, that after an engine start the catalytic converter exceeds a temperature $T_K$ of 300° C., 450° C. or 550° C. within 30 sec., preferably within a time interval of 20 sec., particularly preferred within 10 sec. after an engine start.

In order to reach a quick heating of the catalytic converter, according to an embodiment it is provided for a spark retard at an ignition angle of at least 10° after ZOT in a homogeneous operation. Furthermore, a delayed injection of fuel is carried out optionally, preferably having an end of the injection at an injection angle in a range of 80° to 10° before ZOT in a homogeneous or stratified charging operation.

Furthermore, as a heating action in a homogeneous or stratified charging operation a multiple injections of fuel may be carried out. The multiple injections comprise at least one first, early fuel injection during an intake stroke and at least one second, late injection in a compression stroke of a cylinder. Preferably, a multiple injection having an end of injection of the late injection of 40° before ZOT and an ignition angle of 30° after ZOT is carried out. Furthermore it is provided for, that an end of the late injection is carried out at an injection angle of 80° to 10° before ZOT, particularly of 60° to 25° before ZOT.

Depicted in FIG. 4 are the cumulative tail pipe and the cumulative exhaust gas emissions before the catalytic converter for carbon monoxide CO, carbon hydrides HCG as well as nitrogen oxides NOx for a method according to an embodiment during the first 200 seconds of the New European Driving Cycle.

Figure 4A:
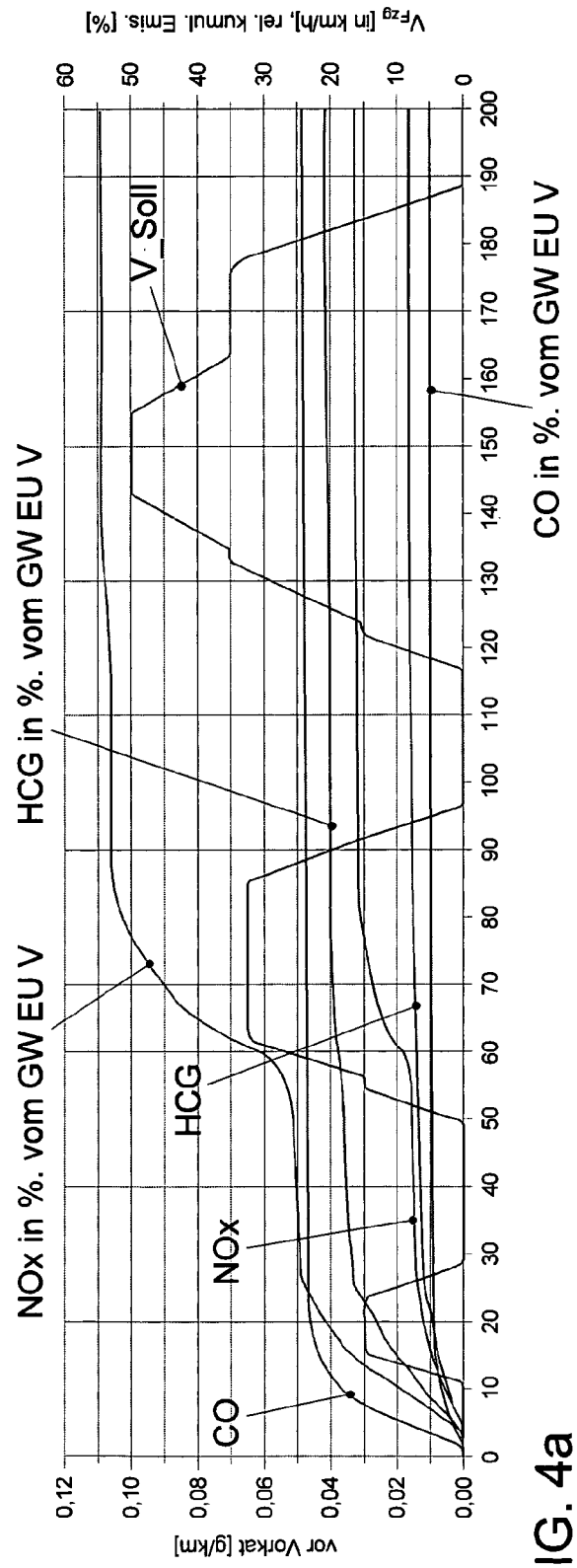
FIG. 4 shows the tail pipe emission and the cumulative exhaust gas emission before the catalytic converter of an internal combustion engine according to an embodiment.

It can be seen from FIG. 4a, that the cumulative exhaust gas emission of NOx before the catalytic converter during the first 60 seconds is less than 0.05 g/km, the cumulative exhaust gas emission HCG before the catalytic converter is less than 0.075 g/km and the cumulative exhaust gas emission CO before the catalytic converter is less than 0.15 g/km. This way, using the method according to an embodiment the cumulative exhaust gas emissions before the catalytic converter mentioned are below the limit values of the EU 4 Standard during the first 60 seconds of the New European Driving Cycle.

Figure 4B:
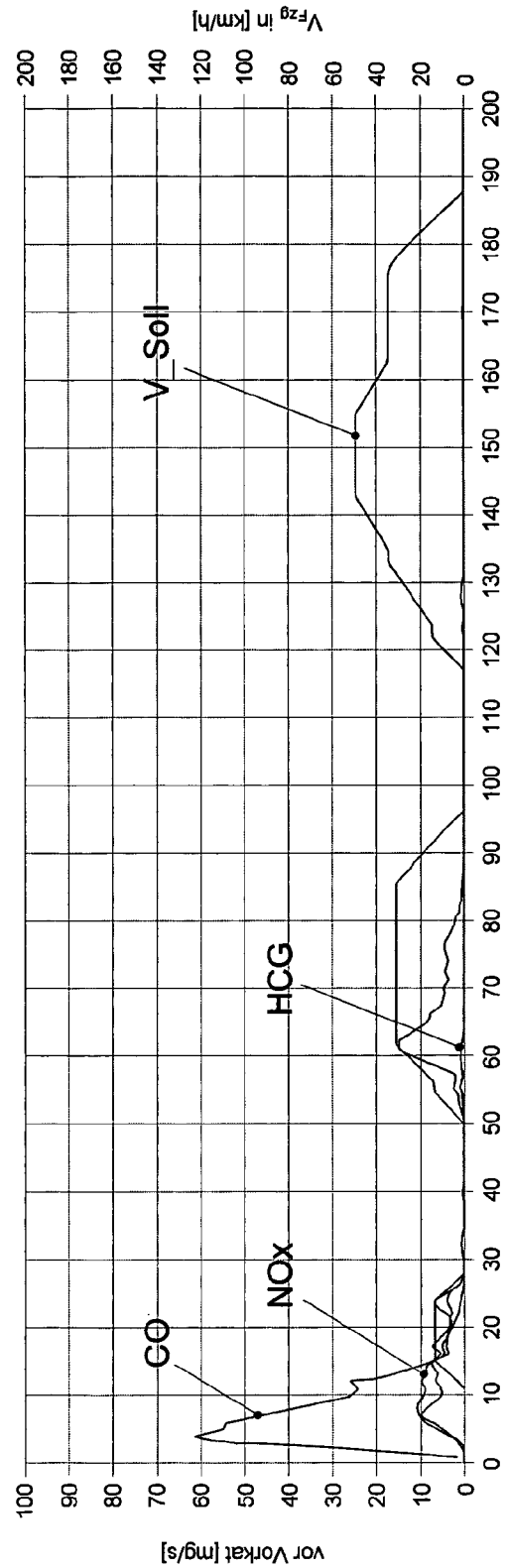

Illustrated in FIG. 4b are the tail pipe emissions, this is to mean the emissions downstream of the catalytic converter system, when using a method according to an embodiment, within the first 200 seconds of the New European Driving Cycle. It can be seen, that the NOx emission is lower than 15 mg/second and the hydrocarbon emission is lower than 15 mg/second throughout the whole time interval. The carbon monoxide CO emission is lower than 65 mg/second throughout the whole time interval.

The emissions presented have been measured in a direct-injection internal combustion engine having 1.4 l of engine displacement and 88 KW of output power and an exhaust-driven turbocharger without an additional compressor, which by means of a heating action according to an embodiment after an engine start has heated the catalytic converter to a temperature $T_K$ of 300° C. within 10 seconds after the engine start at standard conditions.

Using the method according to an embodiment emissions downstream of the catalytic converter systems (tail pipe) can be achieved, which fulfill at least the limit values of EU Standard 4 or even EU Standard 5 during the New European Driving Cycle.

What is claimed is:

1. A method for after-treatment of an exhaust gas of an internal combustion engine, comprising:
feeding the exhaust gas through a catalytic converter system connected downstream of the internal combustion engine and comprising at least one catalytic converter having a noble metal depletion comprising at least the elements palladium and rhodium, wherein the elements palladium and rhodium are present in the noble metal depletion in a weight ratio of >5:1, 6:1, 7:1, 8:1, 9:1, 10:1, 11:1 or 12:1, operating the catalytic converter such that:

after an engine start of the internal combustion engine during an operation according to the New European Driving Cycle, the catalytic converter exceeds a temperature $T_K$ of 300° C. within a time interval of 30 seconds, and the catalytic converter has a depletion comprising rhodium $B_{Rh}$ between 0.221 g and 0.106 g, wherein within 10 seconds after the engine start during the operation according to the New European Driving Cycle the cumulative exhaust gas emissions before the catalytic converter includes at least one of: carbon hydrides having a concentration not exceeding 0.05 g/km and nitrogen oxides having a concentration not exceeding 0.04 g/km, and wherein the internal combustion engine achieves at least the emission limit values of EU Standard 4 during the New European Driving Cycle.

2. A method for after-treatment of an exhaust gas of an internal combustion engine, comprising:

feeding the exhaust gas through a catalytic converter system arranged downstream of the internal combustion engine and comprising a catalytic converter having a noble metal depletion comprising the elements palladium and rhodium, wherein the elements palladium and rhodium are present in the noble metal depletion in a weight ratio of >5:1, 6:1, 7:1, 8:1, 9:1, 10:1, 11:1 or 12:1, operating the catalytic converter system such that:

after an engine start of the internal combustion engine during an operation according to the New European Driving Cycle, the catalytic converter exceeds a temperature $T_K$ of 300° C. within a time interval of 30 seconds, and within 10 seconds after the engine start during the operation according to the New European Driving Cycle the cumulative exhaust gas emissions before the catalytic converter includes at least one of: carbon hydrides having a concentration not exceeding 0.05 g/km and nitrogen oxides having a concentration not exceeding 0.04 g/km, the internal combustion engine achieves at least the emission limit values of EU Standard 4 during the New European Driving Cycle, and the internal combustion engine has an operating point related specific fuel consumption of less than 580 g/kWh at a rotational speed of 1200 min$^{-1}$ and an effective medium pressure of 1 bar.

3. The method according to claim 1, wherein a temperature $T_K$ of 300° C. is not undercut or only is undercut for time intervals of altogether x seconds within the remaining measurement interval of the New European Driving Cycle after a starting phase of 30 seconds or 20 seconds or 10 seconds.

4. The method according to claim 1, wherein the catalytic converter has a depletion comprising rhodium $B_{Rh}$ of 0.177 g, 0.142 g or 0.106 g for a catalytic converter comprising a volume $V_K$ of 1.0 liters.

5. The method according to claim 1, wherein the catalytic converter has a specific noble metal depletion comprising palladium and rhodium of at most 100 g/ft$^3$, 80 g/ft$^3$, 60 g/ft$^3$ 40 g/ft$^3$ or 20 g/ft$^3$ in relation to the volume $V_K$ of the catalytic converter.

6. The method according to claim 1, wherein the catalytic converter has a volume $V_K$ of between 0.9 and 1.4 1.

7. The method according to claim 1, wherein the catalytic converter has a comb shaped support comprising a surface formed as a washcoat having a geometric surface GSA of between 3.0 m$^2$ and 4.0 m$^2$.

8. The method according to claim 1, wherein the internal combustion engine is charged by means of an exhaust-driven turbocharger comprising a compressor section and a turbine.

9. The method according to claim 8, wherein the internal combustion engine in addition is supercharged by means of a compressor arranged in an air inlet port upstream of the compressor section of the exhaust-driven turbocharger.

10. The method according to claim 1, wherein the internal combustion engine is operated or is operable without an external exhaust gas recirculation.

11. The method according to claim 1, wherein the internal combustion engine has an engine displacement of between 0.9 1 and 2 1, or of 1.2 1 or 1.4 1.

12. The method according to claim 1, wherein the internal combustion engine provides or can provide at least one of: a specific output power of 50 to 80 KW/l and a specific torque of 120 to 170 Nm/l.

13. The method according to claim 1, wherein after the engine start a heating action is initiated, which comprises at least one of: a spark retard comprising ignition angles of at least 10° after a top dead center ignition point, a late injection, and multiple injections.

14. The method according to claim 1, wherein the heating action comprises at least one of: an exhaust gas afterburning and a fuel post-injection.

15. The method according to claim 2, wherein the internal combustion engine has an operating point related specific fuel consumption of less than 410 g/KWh at a rational speed of 2000 min$^{-1}$ and at 2 bars of effective medium pressure.

16. A device for after-treatment of an exhaust gas of an internal combustion engine for a motor vehicle, comprising:

a catalytic converter system connected downstream of the internal combustion engine and comprising at least one catalytic converter having a noble metal depletion comprising at least the elements palladium and rhodium, wherein the elements palladium and rhodium are present in the noble metal depletion in a weight ratio of >5:1, 6:1, 7:1, 8:1, 9:1, 10:1, 11:1, 12.1 or 18:1, wherein the device is configured for a operation such that:

after an engine start of the internal combustion engine during an operation according to the New European Driving Cycle the catalytic converter has a temperature $T_K$ of at least 300° C. within a time interval of 30 seconds, the catalytic converter has a depletion comprising rhodium $B_{Rh}$ between 0.221 g and 0.106 g, within 10 seconds after the engine start of the internal combustion engine during the operation according to the New European Driving Cycle the cumulative exhaust gas emissions before the catalytic converter includes at least one of: carbon hydrides having a concentration not exceeding 0.05 g/km and nitrogen oxides having a concentration not exceeding 0.04 g/km, and the internal combustion engine achieves at least the emission limit values of EU Standard 4 during the New European Driving Cycle.

17. A device for after-treatment of an exhaust gas of the internal combustion engine comprising:

a catalytic converter system connected downstream of the internal combustion engine and comprising a catalytic converter having a noble metal depletion comprising the elements palladium and rhodium, wherein the elements palladium and rhodium are present in the noble metal depletion in a weight ratio of >5:1, 6:1, 7:1, 8:1, 9:1, 10:1, 11:1, 12:1 or 18:1, wherein the device is configured for a operation such that:

after an engine start of the internal combustion engine during an operation according to the New European Driving Cycle the catalytic converter exceeds a temperature $T_K$ of 300° C. within a time interval of 30 seconds, and within 10 seconds after the engine start during the operation according to the New European Driving Cycle the cumulative exhaust gas emissions before the catalytic converter includes at least one of: carbon hydrides having a concentration not exceeding 0.05 g/km and nitrogen oxides having a concentration not exceeding 0.04 g/km, the internal combustion engine achieves at least the emission limit values of EU Standard 4 during the New European Driving Cycle, and the internal combustion engine has an operating point related specific fuel consumption of less than 580 g/kWh at a rotational speed of 1200 $\text{min}^{-1}$ and an effective medium pressure of 1 bar.

18. The method according to claim 2, wherein a temperature $T_K$ of 300° C. is not undercut or only is undercut for time intervals of altogether x seconds within the remaining measurement interval of the New European Driving Cycle after a starting phase of 30 seconds or 20 seconds or 10 seconds.

19. The method according to claim 1, wherein the catalytic converter has a depletion comprising rhodium $B_{Rh}$ of 0.221 g, 0.178 g or 0.134 g for a catalytic converter comprising a $V_K$=1.258 liters.

20. The method according to claim 2, wherein the catalytic converter has a specific noble metal depletion comprising palladium and rhodium of at most 100 g/ft³, 80 g/ft³, 60 g/ft³ 40 g/ft³ or 20 g/ft³ in relation to the volume $V_K$ of the catalytic converter.

21. The method according to claim 2, wherein the catalytic converter has a volume $V_K$ of between 0.9 l and 1.4 l.

22. The method according to claim 2, wherein the catalytic converter has a comb shaped support comprising a surface formed as a washcoat having a geometric surface GSA of between 3.0 m² and 4.0 m².

23. The method according to claim 2, wherein the internal combustion engine is charged by means of an exhaust-driven turbocharger comprising a compressor section and a turbine.

24. The method according to claim 23, wherein the internal combustion engine in addition is supercharged by means of a compressor arranged in an air inlet port upstream of the compressor section of the exhaust-driven turbocharger.

25. The method according to claim 2, wherein the internal combustion engine is operated or is operable without an external exhaust gas recirculation.

26. The method according to claim 2, wherein the internal combustion engine has an engine displacement of between 0.9 l and 2 l, or of 1.2 l or 1.4 l.

27. The method according to claim 2, wherein the internal combustion engine provides or can provide at least one of: a specific output power of 50 to 80 KW/l and a specific torque of 120 to 170 Nm/l.

28. The method according to claim 2, wherein after the engine start a heating action is initiated, which comprises at least one of: a spark retard comprising ignition angles of at least 10° after a top dead center ignition point, a late injection, and multiple injections.

29. The method according to claim 2, wherein the heating action comprises at least one of: an exhaust gas afterburning and a fuel post-injection.

30. The method according to claim 2, wherein the internal combustion engine has an operating point related specific fuel consumption of less than 300 g/KWh at a rotational speed of 3500 $\text{min}^{-1}$ and 6 bars of effective medium pressure.

31. The device according to claim 16, wherein the catalytic converter has a depletion comprising rhodium $B_{Rh}$ of 0.177 g, 0.142 g or 0.106 g for a catalytic converter comprising a $V_K$=1.0 liters.

32. The device according to claim 16, wherein the catalytic converter has a depletion comprising rhodium $B_{Rh}$ of 0.221 g, 0.178 g or 0.134 g for a catalytic converter comprising a $V_K$=1.258 liters.

33. The device according to claim 17, wherein the internal combustion engine has an operating point related specific fuel consumption of less than 410 g/kWh at a rotational speed of 2000 $\text{min}^{-1}$ and an effective medium pressure of 2 bar.

34. The device according to claim 17, wherein the internal combustion engine has an operating point related specific fuel consumption of less than 300 g/kWh at a rotational speed of 3500 $\text{min}^{-1}$ and an effective medium pressure of 6 bar.

* * * * *